US005602729A

United States Patent [19]

Krueger et al.

[11] Patent Number: 5,602,729

[45] Date of Patent: Feb. 11, 1997

[54] METHOD AND APPARATUS FOR MONITORING AND CONTROLLING MULTIPROCESSOR DIGITAL DATA PROCESSING SYSTEMS

[75] Inventors: Michael Krueger, Nashua; Paul P. Pennell, Goffstown, both of N.H.

[73] Assignee: Mercury Computer Systems, Inc., Chelmsford, Mass.

[21] Appl. No.: 213,982

[22] Filed: Mar. 15, 1994

[51] Int. Cl.$^{6}$ .............................. G06F 11/30; G06F 11/00

[52] U.S. Cl. ................ 395/704; 395/183.22; 395/184.01

[58] Field of Search .................................... 395/650, 700, 395/183.07, 183.22, 184.01; 364/264, 264.2, 264.4, 264.5, 264.6, 266, 267, 267.1, 267.2, 267.3, 267.4, 267.5, 267.6, 267.7, 267.91, 921.8

[56] References Cited

U.S. PATENT DOCUMENTS

| | | | |
|---|---|---|---|
| 4,821,178 | 4/1989 | Levin et al. | 364/200 |
| 5,047,919 | 10/1991 | Sterling et al. | 364/200 |
| 5,165,036 | 11/1992 | Miyata et al. | 395/800 |
| 5,253,359 | 10/1993 | Spix et al. | 395/575 |

OTHER PUBLICATIONS

"A Noninvasive Architecture to Monitor Real-Time Distributed Systems" by J. P. Tsai et al, Computer Magazine Mar. 1990, vol. 23, Iss. 3, pp. 11–23.

"NDB-Parallel Source Level Debugger", ParaSoft Corporation, Mission Viejo, CA, 3 pages, publicily available at least as early as Mar. 1991.

"REMEDY™-A Remote Real-Time System and Source Level Debugger", Multiprocessor Toolsmiths Inc., 4 pages, publicily available at least as early as Jun. 1992.

"Remedy Debugger-Real-Time Applications Debugger User's Guide", Release 3, Jan. 1992, Multiprocessor Toolsmiths Inc., 76 pages.

Excerpt of DERWENT computer database search conducted in Sep. 1993, 10 pages.

*Primary Examiner*—Alvin E. Oberley
*Assistant Examiner*—Michael T. Richey
*Attorney, Agent, or Firm*—Choate, Hall & Stewart

[57] ABSTRACT

The invention provides a system debugger for monitoring and controlling the operation of the multiprocessor. The debugger includes a view planning element that responds to operator input for generating a view signal specifying a subset of the first set of characteristics to be monitored. Likewise, a bundle planning element responds to operator input for generating a bundle signal specifying which functional units to be monitored. During operation of the multiprocessor, a runtime element monitors the operation of at least the functional units specified by the bundle signal to generate an output signal (e.g., for display on the user's monitor) representing values of the subset of characteristics specified by the view signal. The runtime element includes functionality for determining, for each of the specified functional units, which of its characteristics are in the specified subset. For those that are the runtime element generates the output signal to include subsignals representing the value of those specified characteristics. For that those are not, the runtime element generates the output signal to include a subsignal indicating the inapplicability of that characteristic to that functional unit.

8 Claims, 2 Drawing Sheets

METHOD AND APPARATUS FOR MONITORING AND CONTROLLING MULTIPROCESSOR DIGITAL DATA PROCESSING SYSTEMS

REFERENCE TO APPENDICES

The disclosure of this patent document contains material which is subject to copyright protection. The owner thereof has no objection to facsimile reproduction by anyone of the patent document or the patent disclosure, as it appears in the U.S. Patent and Trademark Office patent file or records, but otherwise reserves all copyright whatsoever.

BACKGROUND OF THE INVENTION

The invention pertains to digital data processing and, more particularly, to improved methods and apparatus for monitoring and controlling the operation of multiprocessor computer systems.

The earliest computer systems typically employed a single processor that executed a single programming task from start to finish. Monitoring and controlling the execution of the instructions making up that task was relatively straightforward. For example, if computer repeatedly "crashed" while executing a task, additional programming steps could be added to display and, perhaps, change intermediate program values.

With increases in the complexity of software and hardware, processors are now called upon to interleave the execution of the instructions of multiple tasks. For example, if the instructions of a program (e.g., a word processor or spreadsheet) refer to data that is not currently in main memory, the resulting trap causes the processor to temporarily suspend execution of those instructions so that the processor can execute operating system instructions for loading the missing data into memory. Or, when a hardware device (e.g., a modem) requires service, it generates an interrupt that causes the processor to begin executing instructions necessary to service the interrupt.

Monitoring and controlling processors under these circumstances is difficult. Fortunately, most operating systems are equipped with software packages called "process debuggers" that permit users (and, more typically, programmers) to monitor and control the step-by-step execution of individual programs running on the computers. These debuggers usually afford the user control over execution of the program itself, but not over other related processes that may be running concurrently with it, nor over relevant aspects of the computer's operating system itself.

While process debuggers have proven satisfactory for small computer systems, such as those with only a single processor, they are generally inadequate for monitoring and controlling the operation of large ones, particularly, those with multiple processors. Such large systems, which represent a widely used approach to achieving higher aggregate computing power, are now commercially available with upwards of 1,000 processors.

The complexities of physical construction and hardware architecture of such systems are paralleled in the software that runs on those systems. To facilitate the design and implementation of such software, the art has made several attempts to adapt process debugging tools to the more complex task of "system" debugging. These attempts have met only limited success, however. This is partly due to the lack of access and control of all information from on-going processes. It is also due to the inability of those debuggers to adequately present the vast quantity of information available from the multiprocessor about its "functional units," i.e., its processing elements, hardware interconnect elements, software processes and interprocess communications.

It is therefore an object of this invention to provide improved methods and apparatus for monitoring and controlling the operation of multiprocessor digital data processing systems. More particularly, an object of the invention to provide an improved debugger having enhanced femures for system-level operation with large computer configurations.

A further object is to provide such methods and apparatus for monitoring and controlling the software aspects of such systems, both at the process level and at the interprocess communications level.

Still another aspect of the invention is to provide such methods and apparatus for monitoring the hardware aspects of such systems, both at the level of the processing element and at the level of the hardware interconnect element.

Yet another aspect of the invention is to provide such methods and apparatus that are capable of monitoring and controlling only those hardware and software characteristics of the multiprocessor system as are requested by the user.

These and other objects of the invention are evident in the drawings and in the description which follows.

SUMMARY OF THE INVENTION

The aforementioned objects are attained by the invention, which provides in one aspect an improvement on a multiprocessing system of the type having plural functional units, e.g., its process and interconnect elements, its software processes and its interprocess communications, whose characteristics (or attributes), together, can be referred to as a "first set" of characteristics (or attributes).

The improvement is characterized by functionality for monitoring and controlling the operation of the multiprocessor. In this regard, the apparatus includes a view planning element that responds to operator input for generating a view signal specifying a subset of the first set of characteristics to be monitored. Likewise, a bundle planning element responds to operator input for generating a bundle signal specifying which functional units to be monitored.

In the event that several interrelated aspects of the multiprocessor were suspected of causing a "crash," for example, the view planning element could be invoked to identify those characteristics considered most likely to be causing the error.

During operation of the multiprocessor, a runtime element monitors the operation of at least the functional units specified by the bundle signal to generate an output signal (e.g., for display on the user's monitor) representing values of the subset of characteristics specified by the view signal. The runtime element includes functionality for determining, for each of the specified functional units, which of its characteristics are in the specified subset. For those that are, the runtime element generates the output signal to include subsignals representing the value of those specified characteristics. For those are not, the runtime element generates the output signal to include a subsignal indicating the inapplicability of that characteristic to that functional unit.

An apparatus according to this aspect of the invention facilitates monitoring and control of the multiprocessors. Rather than generating the output signal to include all information about all functional units, it permits the operator to specify specific functional units and characteristics to be monitored. Moreover, because the apparatus accommodates independent specification of the functional units and characteristics to be monitored, the burden on the operator is greatly reduced.

With regard to the latter point, those skilled in the art will appreciate that an apparatus according to this aspect of the invention spares the operator from having to detail the specific characteristics that are to be monitored for each named functional unit. As noted, where there are mismatches between a specified functional unit and the specified characteristics, the runtime element generates an output subsignal indicating the inapplicability of the characteristic. This can be represented, for example, by the characters "N/A" on a visual display of the output.

In another aspect of the invention, the view planning element responds to operator input to generate the view signal to specify, among the subset of characteristics to be monitored, datapoints and/or controlpoints. Those skilled in the art will appreciate that a datapoint is information (e.g., a datum) accessed or affected by a functional unit, whereas a controlpoint is an operational state of the functional unit.

According to this aspect of the invention, the planning element can include an editor that responds to operator input to access or alter at least the specified data and controlpoints. The editor permits access and modification of the datapoints independent of the operational state of the respective functional unit and, conversely, access and modification of the controlpoints independent of information accessed or affected by that functional unit.

It will appreciated that these features provide the operator considerable flexibility in controlling operation of the multiprocessor. For example, unlike conventional debuggers that typically permit the operator to modify datapoints only after operation has been suspended at a controlpoint (e.g., a "breakpoint"), an apparatus according to this aspect of the invention permits the operator to modify datapoints even if the multiprocessor is operating between controlpoints.

In still further aspects, the invention provides a multiprocessor as described above where the runtime element includes a supervisor that monitors the specified functional units and selectively generates the output signal based on the operation and status of those units. A user interface generates, from that output signal, a display of the selected subset of characteristics for the selected functional units. The supervisor responds to delay in generation of the display by the user interface by decreasing the bandwidth of the output signal, e.g., by transmitting in the output signal fewer characteristic values than those obtained by monitoring the functional units, or by monitoring those functional values less frequently.

Another aspect of the invention provides a multiprocessor apparatus as described above wherein the bundle planning element permits the operator to identify the functional units to be monitored based on a functional unit identification, functional unit name, and topological location in the multiprocessor.

The invention provides, in another aspect, an improved multiprocessor that includes a controlpoint-setting element that responds to operator input to generate a controlpoint-setting signal representing (i) a controlpoint triggering condition, (ii) a controlpoint scope signal specifying a set of functional units to be affected upon occurrence of that condition, and (iii) a specified action to be effected on those functional units. A detection element responds to the controlpoint-setting signal by monitoring the specified functional units functional to identify an occurrence of the triggering condition. When that condition occurs, the specified action is performed on the specified set of functional units.

According to a related aspect of the invention, the controlpoint-setting signal can include a subsignal indicating that, upon occurrence of the specified condition, operation of the specified set of functional units is to be suspended or resumed or, alternatively, that a functional unit-level debugger (e.g., an process debugger) is to be invoked on those units.

In the event that a functional unit-level debugger is invoked, an apparatus according to the invention can release control of the specified functional units to that debugger and temporarily suspending operation of the detection element until re-release by that debugger.

The invention provides, in other aspects, methods for operating a multiprocessor digital data processing system paralleling the operations described above.

These and other aspects of the invention are evident in the drawings and in the description that follows.

BRIEF DESCRIPTION OF THE ILLUSTRATED EMBODIMENT

DETAILED DESCRIPTION OF THE ILLUSTRATED EMBODIMENT

1. Overview

Figure 1:
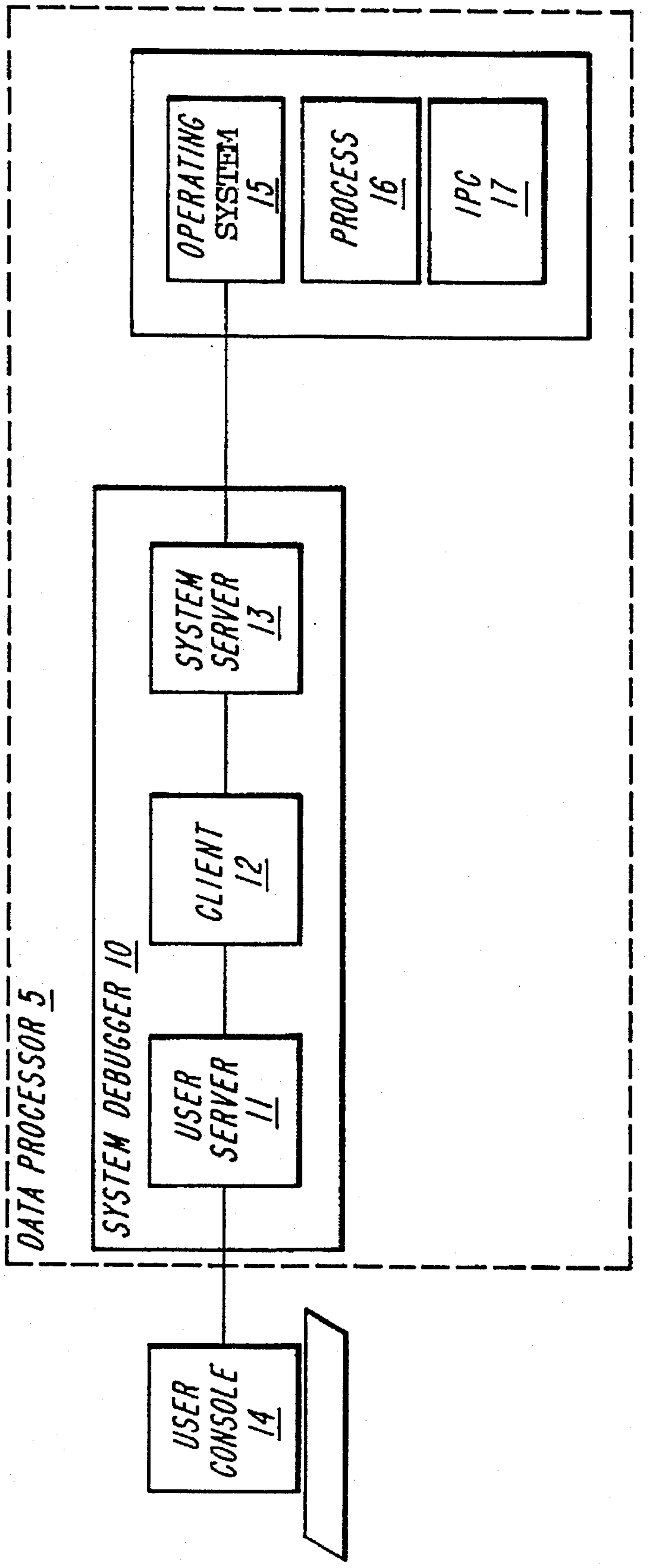
FIG. 1 is a schematic block diagram depicting a digital data processing system incorporating a system debugger constructed in accordance with the invention.

Referring to FIG. 1, a preferred data processor 5 according to the invention includes a system debugger 10 that monitors and controls data processor functional units (or subsystems) of interest, e.g., operating system 15, process 16 and interprocess communication subsystem (IPC) 17, via an interface at operating system 15, as illustrated. The data processor 5 comprises any conventional digital data processing system modified in accord with the teachings herein.

Preferably, data processor 5 is a multiprocessor system and, still more preferably, a multiprocessor system of the type commercially available from the assignee hereof, Mercury Computer Systems, Inc. Aspects of such a multiprocessor system are described in copending, commonly-assigned U.S. patent application Ser. No. 08/058,485, filed May 6, 1993.

Debugger 10 includes a user server 11, a client component (or "client") 12 and a system server 13. The system server 13 provides an interface between the debugger 10 and the data processor subsystems of interest. The client 12 performs primary data storage and processing functions for the debugger, as described below. The user server component 11 receives input from the user and displays system information, including specified information regarding the data processor functional units of interest. The user server 11, client component 12, and system server 13 are separately implemented and communicate using different protocols. A "system protocol" is used between the client 12 and system server 13. A "user protocol" is used between the client 12 and user server 11.

The functional units monitored and controlled by debugger 10 include, but are not limited to, process components and inter-process communication (IPC) components. Thus, other components of the data processor 5 may be monitored and controlled as well, e.g., processors and processor interconnects, as well as software semiphores and sockets. Collectively, the functional units to be monitored and controlled at a given time are termed "subjects."

Those skilled in the art will appreciate that a debugger 10 as described below is highly scaleable, meaning that it can successfully carry out its functions for data processors 5 over a wide size range. Such scalability results, in part, from the debugger 10 architecture and from its ability to automatically detect and compensate for conditions in which its own processing load exceeds practical limits.

The debugger 10 permits the operator or user to select groups of one or more subjects for monitoring and control. These groups, called "bundles," are specified using rules, or filters, as described below. This approach to subject selection allows the user to rapidly identify collections of subjects that are related in one or more ways. It also minimizes the need to re-specify groups of subjects as work with the system proceeds and the system is repeatedly reactivated.

As described below, the debugger 10 permits the operator to select functional unit attributes that are to be monitored, i.e., "datapoints," and to select control actions that are to be imposed, i.e., "controlpoints". The debugger 10 attributes and control actions, which are referred to as "views," are selected separately and independently of the bundles. Datapoints result in output to the user and Controlpoints result in actions on the subjects.

The debugger 10 also allows the user to apply a view to a bundle. The result, which is termed a "display," is a context within which the datapoints and controlpoints specified in the view are used to the greatest possible extent on the subjects in the bundle. The debugger 10 does not enter into an error condition if certain datapoints or controlpoints are not applicable to one or more subjects in the bundle. Thus, all processing associated with a display takes place regardless of the current operational state of the subjects involved.

2. The Servers and Protocols

2.1 The Client-Server Architecture

The client 12, the user server 11, and the system server 13 are preferably implemented as separate processes for execution on processing elements (not shown) in data processor 5. Together, the user server 11, client 12 and system server 13 provide runtime operation of the debugger 10 for monitor and/or controlling operation of the subjects. Moreover, the client 12 and system server 13 may considered as a "supervisor" that monitors the specified functional units and that selectively generates output reflecting based on the operation and status of those units.

With this design, the debugger 10 can sense and manage its own load on the system. Thus, the client 12 and system server 13 can respond to a delay in generation of the display by the user server 11 to decrease the bandwidth of their output, e.g., by generating and sending to the user server 11 for display fewer attribute values than those obtained by monitoring the functional units, or monitoring fewer ones of those values in the first place.

User server 11 has two basic purposes. First, it presents to the user output data supplied by the client 12. Second, it accepts input from the user and sends it to the client 12. Another function of the user server 11 is to respond to queries from the client 12 reflecting the degree of backlog of output data.

The client 12 performs the debugger's 10 central functions. The client 12 relies on the user server 11 to handle interactions with the user. Likewise, it relies on the system server 13 to handle interactions with the operating system 15. Each server 11 and 13 performs its respective functions independently of the other server and of the client 12. Where the underlying data processor 5 is a multiprocessor system, each component preferably runs at a different priority and on a different processing element.

The system server 13 acts on behalf of the client 12 to carry out all actions that involve observation or control actions to be taken on the system and, more particularly, on the subjects. The system server 13 receives commands from the client 12 regarding the nature of the actions needed. The system server 13 sends data, in some cases on a periodic basis that is previously arranged, to the client 12.

2.2 Messages and Protocols

Data exchanged between the client 12 and the system server 13 or user server 11 are carried in messages whose contents conform to the system protocol or user protocol, respectively. Those message are transported between the elements 11–13 in any conventional text communications mechanism. Thus, in a preferred embodiment, each message preferably consists of ASCII text and is terminated with an end-of-line character.

Messages passing to and from each server 11, 13 conform to the user and system protocols, respectively. In the illustrated embodiment, these protocols differ, reflecting the significant dissimilarity of the user and system servers 11, 13. In each protocol, messages emanating from the client 12 are called client messages, while messages emanating from a server 13 are called server messages.

Each server 11, 13 processes messages it receives from the client 12 in the order received.

2.3 The System Protocol

In the system protocol, client messages can optionally contain a sequence number, a one-up number assigned by the client 12. If a client message does contain a sequence number, all related subsequent server messages contain that number. If server messages can not be attributed to a specific client message, the server 13 determines which sequence number to use. Lack of response to a client message by the server 13 constitutes a time-out condition that the client 12 is expected to handle.

Client and server messages can employ opaque data values that uniquely represent certain internal entities. By convention, these values are called "references" for the client 12 and "identifiers" or "id's" for the server 13. The client 12 and server 13 use these values to communicate much more efficiently about specific entities. In general, the client 12 communicates to server 13 in terms of id's and the server 13 communicates to the client 12 in terms of references.

A "session" is a term for a series of related interactions. Sessions are initiated and terminated by the client 12.

In general, a "response message" from the server 13 repeats the request message verb, the sequence number, and the subject entity's retirenee. For commands that create entities in the server, the confirmation message also contains the server's id for the entity.

All "update" server messages are incremental: they contain information changed since the last update.

The effect of the "reset" messages is to reset the incremental update logic so that the next update (which occurs immediately) contain all related information. Incremental updates then resume.

A "notification" is an unsolicited server message regarding an unusual condition and is not to be acknowledged by the client.

The server 13 is permitted to temporarily lengthen any update interval. This can be done without notification to the client.

In the message specifications, the flowing apply:

A indicates an optional field and indicates a mandatory field.

The "symbol expressions" are of the form "symbol", "symbol+offset", or "address".

2.3.1 General Setup Messages

This section describes a set of messages related to initialization and general control of the server.

2.3.1.1 Field Definitions Are

Update: decimal integer-update interval (milliseconds); 0 (zero) means updates are disabled; −1 indicates one update, then disable updates Filter: a filter expression (see the design specification for the client, below)

SID: subject identification number

2.3.1.2 Client Message Definitions

PB <serial number><state filter>[filter]. . . Requests periodic incremental updates of process information per the given filters. The state filter is any combination of the process state codes (R, B, S, D, X) or "*"(any).

PBZ <serial number>—Process browser reset.

CN <serial number><context ref>[update]—Establish a new context.

CC <serial number><contextid>update—Change a context.

CD <serial number><context id>—Delete a context. This message implies a delete of all related internal data in the server.

2.3.1.3 Server Message Definitions

CN <serial number><context ref><context id>—Identifies new context.

CD <serial number><context ref>—Confirms deletion of context.

2.3.2 Messages Related to Bundles

2.3.2.1 Client Message Definitions

BN <serial number><context id><bundle ref><SID>. . . Creates a bundle and associates it with a context.

BC <serial number><bundle id>[+SID][−SID]. . . Adds and/or removes SIDs from the bundle id's SID list.

BHO <serial number>SID Hand-off of subject to external tool. Breakpoints are withdrawn, datapoints stop reporting, all process index values stay the same BHB <serial number>SID Handback of subject from external. Breakpoints are reinstated, datapoints resume reporting.

BS <serial number><bundle id>[SID. . .]Suspends some or all subjects in the bundle. If there are no SID parameters, all processes in the bundle are suspended. Any SID parameters that are not members of the bundle are ignored and a warning message issued.

BD <serial number><bundle id>[SID. . . ]Same as the BS command, but core dumps the subject's internal state to a file.

BI <serial number><bundle id>[SID. . . ]Same as the BS command, but steps the subject by one operation.

BR <serial number><bundle id>[SID. . .]Same as the BS command, but resumes the subject.

BK <serial number><bundle id>[SID. . .]Same as the BS command, but kills the subject.

2.3.2.2 Server Message Definitions

BN <serial number><bundle ref><bundle id>Supplies data regarding a new bundle.

BC <serial number><bundle ref<SIDs>. . . Confirms and provides the new SID list for the bundle id.

BHO <serial number>SID Confirms hand-off of a SID.

BHB <serial number>SID Confirms handback of a SID.

2.3.3 Datapoint

2.3.3.1 Fields

State: eld enable/disable initial condition

Size: decimal integer element size in bytes (1 . . . n or zero for string)

Count: decimal integer number of elements (>=1)Data Display new—client

2.3.3.2 Client Message Definitions

DDN <serial number><context id><dd ref><symbol expression>[state [size [count]]]Creates a new datapoint and associates it with a context.

DDC <serial number><context id><dd id>symbol expression [size [count [state]]]Change a Datapoint.

DDA <serial number><context id><dd id>state [SID]. . . Changes state of a Datapoint for the listed SIDs (within the bundle).

DDD <serial number><context id><dd id>Delete a Datapoint.

2.3.3.3 Server Message Definitions

DDN <serial number><dd ref><dd id><values>. . . Provides the new Datapoint id and initial Datapoint values. Values are the current values in the Datapoint locations in each process. Values are a hex integer (of a size corresponding to the size specified in the original DDN message), "NA" for inapplicable symbols, or "NX" for non-existent locations. In the case of multiple values, they are row-major (process-major).

DDC <serial number><dd reIN <values>. . . Respond to a Datapoint change message. Values provided only if they have changed as a result of the client's DDC command.

DDA <serial number><dd rein <values>. . . Respond to an adjust Datapoint message. Values are provided only if they have changed as a result of the client's DDA command.

DDD <serial number><dd ref>—Delete a Datapoint.

2.3.4 Controlpoint 2.3.4.1 Fields

State: e|d—enable/disable initial condition

Effect: p|s|d—proceed, suspend, debug (implies suspend)

Log: l|i—log or ignore

Scope: p|b|n|c—scope of effect for breakpoint: process, bundle, node, cluster

Type: n|r|w|e—type of watchpoint: not watchpoint, read, write, either 2.3.4.2 Client Message Definitions BPN <serial number><context id><bp ref:><symbol expression>[state [effect [log [scope [type]]]]]Creates a new breakpoint.

BPC <serial number><context id><bp id><symbol expression>[state [effect [log [scope [type]]]]]Changes are applied to all breakpoints for bp id. Unspecified parameters mean "no change".

BPA <serial number><context id><bp id>state [SID]. . . Changes state of a breakpoint for the listed SIDs (within the bundle).

BPD <serial number><context id><bp id>Delete a breakpoint.

2.3.4.3 Server Message Definitions

BPN <serial number><bp rein <bp id><values>. . . Confirms and provides the breakpoint id. Values are the addresses of the breakpoints in each process. Values are a hex integer, "NA" for inapplicable symbols, or "NX" for non-existent locations.

BPC <serial number><bp ref><values>. . . Respond to breakpoint change message. This is the same as what is done for BPN.

BPA <serial number><bp ref><values>. . . Respond to breakpoint adjust message. Values provided only if they have changed as a result of the client's BPA command.

BPU <serial number><bp ref>SID Supplies controlpoint update information. Provides notification that a process is now suspended, is on a breakpoint and logging is on.

BPD <serial number><bp ref>—Confirm deletion of Controlpoint.

2.3.5 Update Messages

All update messages are server messages.

PU <serial number><process information>. . . —Subject browser update.—The process information fields are repeating sets of: SID: the subject ID (hex, without the leading 0x) status: R|B|S|D|X (ready, blocked, suspended, dead, executing) name: subject's name BU <serial number><bundle ref><process information>. . . Subject update.

The process information fields are repeating sets of: SID: the subject ID (hex, without the leading Ox) index: indicates the nth process in the bundle status: R|B|S|D|X (ready, blocked, suspended, dead, executing) location counter: a symbol expression (is "-" if status is "x")

DDU <serial number><dd ref><index value [value]. . . >. . . Datapoint update. Provides changed Datapoint values.

Values are repeating sets of: index: indicates the nth subject in the bundle values: a list of hex values, where unchanged values are represented by "-" instead of a number 2.3.6 Control Messages All control messages are client messages. The client uses the control interface to perform high-level adjustments to the server.

CRI <serial number><update>Initiate session. Begins a session for this client. A client can have only one session at a time.

CRS <serial number>Suspend session. All system interaction on behalf of this session is suspended. This is a way to temporarily stop mvmc's real-time impact on the system.

CRR <serial number>Resume session. This is the reverse of the "suspend session" command.

CRT <serial number>Terminate session. The session is terminated, which has the side-effect of gracefully eliminating all mvmc operations related to this session.

CRC <serial number><update>Change session. An update value of −1 indicates one update, then disable updates.

CNX - Client program termination. The client is terminating gracefully. This command implies a session termination.

CNE - Client error. The client in terminating abnormally, perhaps ungracefully. This command implies a session termination.

2.4 User Protocol

In the preferred, illustrated embodiment, client messages cause the user server 11 to create and alter a graphical user interface (GUI). The specifics of the GUI's design are determined within the User Server 11 and are not relevant to the Client 12. The client 12 expects a certain set of GUI artifacts, called "widgets," to be present without regard to their position, size, color, etc. There are a fixed set of widget types. There can be any number of specific widgets, each with a pre-arranged name that is used in messages.

There are two types of client messages, window messages and widget messages. Window messages cause the server to conduct operations on windows, which are areas of the screen that contain widgets. Widget messages cause the server to perform operations on individual widgets within a window.

Window messages have the form: <window command><parameters . . . >

Widget messages have the form: <widget class>widget name {widget command parameters . . . }. . .

2.4.1 Window Messages

New <window-type><window-reference><title>Create a new window of the given type and assign to the given reference.

Delete <window-reference>Popdown, unmanage, and destroy the window identified by the given reference.

Use <window-reference>Make the given window the current window.

Show <window-reference>Manage and popup the given window.

Hide <window-reference>Popdown a window.

Iconify <window-reference>Iconify a window.

Deiconify <window-reference>Deiconify a window

2.4.2 Widget Messages

2.4.2.1 Button

Button <widget name>enable Make button sensitive.

Button <widget name>disable Make button insensitive

Button <widget name>label <string>Change button's label.

2.4.2.2 Toggle

Toggle <widget name>enable Make toggle sensitive.

Toggle <widget name>disable Make toggle insensitive

Toggle <widget name>set <Boolean value>Change the toggle's state to the given Boolean value.

2.4.2.3 Entry (Editable Text)

Entry <widget name>enable Make entry sensitive.

Entry <widget name>disable Make entry insensitive.

Entry <widget name>clear. Change entry's value to be empty.

Entry <widget name>set <string>Change the entry's value to the given string.

Entry <widget name>editable -;Boolean>Allow or disallow editing per the given Boolean value.

Entry <widget name>get Cause the entry to emit it's current value in a server message.

2.4.2.4 Label

Label <widget name>enable Make label sensitive.

Label <widget name>disable Make label insensitive.

Label <widget name>clear. Change label's value to be empty.

Label <widget name>set <string>Change the label's value to the given string.

2.4.2.5 Matrix

2.4.2.5.1 Operands

In the matrix messages an "operand" specifies what parts of the matrix are to be affected by the message. An operand takes one of the following four forms:

| | |
|---|---|
| r.row_spec | -- all cells in the row(s) identified by the row_spec |
| r.row_spec.cell spec | -- cell(s) in the row(s) identified by the row_spec |
| c.column_spec | -- all cells in the column(s) identified by the column_spec |
| c.column_spec.cell spec | -- cell(s) in the column(s) identified by the column_spec |

The row spec, column spec, and cell-spec fields take one of two forms:

spec—a single specified value spec-spec—a range of values

The spec fields take one of the following forms:

n=a non-negative decimal index

*=all possible values $=highest possible value

+=the next value after the current highest possible value

2.4.2.5.2 Commands

The Matrix widget commands are of the form: {command operand directive parameters}

The parameters differ liar each command. Each parameter takes one of the following forms: <int>—integer <Boolean>—Boolean value of 0 or 1 <align>—alignment values of [Bb], [Cc], [Ee] for beginning, center, end <string>—a character string config * <directive><parameters>—Configures the entire matrix.

Parameters:

fixedRows <int> fixedColumns <int>Set the number of non-scrolling rows or columns.

visibleRows <int> visibleColumns <int>

Set the number of visible rows or columns. rowLabelWidth <int>

Set the width for all labels at the left of each row.

boldLabels <Boolean:>Set the row and column labels to be displayed in a bold typeface.

topRow <int>Cause the matrix to scroll such that the given column is at the top.

config <row spec>attribute value config <column spec>attribute value Configures a row or column.

Parameters:

label <string>Change the label liar the row or column.

labelAlignment <align>Set the alignment of row or column labels.

alignment <align>Set the alignment of data in cells (for columns only).

maxLength <int>Set the maximum display size of data in cells (for columns only).

width <int>Set the width of cells (for columns only).

select <Boolean>Set the selection condition of cells according to the parameter.

config <row spec.cell spec>attribute value config <column spec.cell spec>attribute value—Configures a row or column.

Parameters select <Boolean>Set the selection condition of cells according to the parameter.

insert <column spec><n-columns><values-list><labels-list><widths-list><maxLengths-list><alignments-list><labelAlignments-list> insert <row spec><n-rows><values-list><labels-list>Creates new rows or columns by inserting them before the operand. Parameters are as described in preceding commands and serve as initial values.

remove <column spec> remove <row spec>Removes the rows or columns specified by the operands.

set <operand><string>Sets the value of the cell(s) in the operand to the given string.

edit <row spec.cell spec> edit <column spec.cell spec>Initiates user editing of a cell.

commit <row spec.cell spec> commit <column spec.cell spec>Finalizes user editing of a cell.

cancel <row spec.cell spcc> cancel <column spec.cell spec >Cancels user editing of a cell, restores the previous value.

2.4.3 Widget Class Callback Messages

When the user server 11 needs to present user input to the client 12 a callback message is issued in the following form:

<window-reference><widget-Name><widget-address><action><optional-data>

The action and optional-data fields vary per widget type as follows:

Button widgets: action: "activate"optional-data: integer number of button clicks by user Toggle widgets: action: "changed"optional-data: Boolean value indicating new state of toggle Entry widgets: action: "activate"optional-data: string containing the current text

3. The Client

The following sections describe the classes from which preferred client 12 is implemented. These sections describe the preferred client 12 in a manner appropriate to its "object-oriented" design. Those skilled in the art will appreciate that this is the preferred manner to describe such implementation for purposes of making and using the same.

The client 12 is event-driven by messages from the servers 11, 13: when server messages arrive, the client 12 processes them and may proceed to issue client messages back to the servers 11, 13. The client is preferably implemented in software for execution on a processing element of the data processor 5. More preferably, it is implemented using an object-oriented design. The following sections describe the client in accord with that design by describing the classes of objects that it uses. Client processing occurs when server messages arrive and are processed by certain of the classes described below.

3.1 Initialization and Primary Control Functions

In a preferred embodiment, the client 12 contains initialization functions that create an execution environment for the objects. When the client 12 is initiated, it processes any configuration options on the user command line. The client 12 then checks a known location for a configuration file in which the user may have specified further configuration options. The first objects created by the client 12 are instances of the System and User classes, which represent the System and User Servers respectively. These objects are instructed to start up the software and initialize related communications mechanisms. The client 12 then proceeds to initialize its internal data. The data are set to pre-defined default values unless the user has provided the name of a file on the command line. The client 12 then enters a loop in which it waits for server messages to arrive and, thereafter, initiates their processing. The client 12 also arranges to be notified of the termination of any servers or other programs that it might initiate. Upon such notification, the client 12 attempts to correlate the terminated program with the client's 12 internal data that tracks subordinate programs, then handles the termination accordingly.

3.2 Server Classes

The system server 13 and user server 11 are represented by the System and User classes. respectively. These two classes contain functions that can initiate the server, handle any unusual communications conditions that might arise, and perform the initial decoding of incoming server messages.

A third server class is the debugger class, which can initiate one or more subordinate process debuggers as needed. The debugger coordinates the hand-off and hand-back of specific processes to and from process debuggers (not shown).

3.3 Aspect Classes

Most of the client's internal data is managed by the aspect class and its derived classes. These classes work with the client's data that represents conditions in the system, and they are not directly involved in the user interface. In the following, the examples of derived classes are taken from the support for the process domain. The Aspect class itself is an abstract class that provides fundamental support for "opening" and "closing" aspects.

3.3.1 Session and Related Classes

The Session class is an abstract class derived from the Aspect class. A Session coordinates the use of the other three classes derived from the Aspect class. A Session includes support for using files to save and restore the internal data for the current session so that it can be later re-used. A Session also controls whether the system server 13 is "engaged", that is, interacting with the system.

The PSession class is a concrete class derived from the Session class. A PSession supports the creation, duplication, and deletion of the session's other three subordinate aspects.

3.3.2 Bundle, View, and Display and Related Classes

Bundle, View, and Display are abstract classes derived from the Aspect class. Each can provide a text representation to be displayed in by a Session, and each has fundamental support for the "open" and "close" operations in which the aspect becomes active or inactive. To support the "open" operation, these classes create their corresponding Window objects (see below) and Matrix objects (see below) that serve the purposes of the user interface. These classes use the System object to interact with the system as needed.

The Bundle class maintains collections of objects that represent filters and atoms (explained below). The PBundle class is derived from the Bundle class for the purposes of implementing the actions of filters on the total population of atoms in the system. This class also processes the user's changes to filters.

The View class maintains collections of objects that represent controlpoints and datapoints. The PView class is derived from the View class for the purposes of processing the user's changes to controlpoints and datapoints.

The Display class maintains collections of objects that represent the atoms, or active entities, within the system. A Display presents a dynamic display of the activities of the atoms. The collection of atoms is gained from an associated Bundle. The nature of the data being presented for each atoms is determined by the datapoints gained from an associated View, and that View also provides the controlpoints that the Display uses to control its atoms. The PDisplay class is derived from the Display class for the purposes of controlling the user interface elements specific to processes and interacting with the system via the System object.

3.4 Atom and Related Classes

The Atom class is an abstract class that contains basic data representing a active element in the system. This class also contains a mechanism for searching collections for matching atom objects.

The PAtom class is derived from the Atom class for the purpose of holding data specific to process atoms. Each PAtom object corresponds to a known process in the system. This class also contains functions that can represent the process in text form for user interface purposes.

The PSlice class is derived from the PAtom class and contains additional data needed when a process is being presented in a display.

The AtomManager class is an abstract class that contains sorted collections of current, changed, and new atoms. This class contains specialized searching functions that help locate certain types of atoms.

The PAtomManager class is derived from the AtomManager class for the purposes of using the System object to gain an inventory of processes in the system. This class also handles the resulting messages from the system server 13.

3.5 Filter and Related Classes

The Filter class is an abstract class that contains the patterns and state information for a filter used in bundles. The PFilter class is derived from the Filter class as a specialization for filtering processes. This class contains functions that can create text representations of a process filter for use in the user interface.

3.6 Matrix and Related Classes

The Matrix class is an abstract class that manages the data presented in the many tabular displays used in the user interface. This class maintains a collection of entries that belong to the matrix, handles user server messages related to user's selection of matrix entries, and handles changes to cells in matrix.

The specialization of the Matrix class are as follows: AtomMatrix, PAtomMatrix, and PSliceMatrix for atoms and their variants; BundleMatrix, DisplayMatrix, and ViewMatrix for each aspect's representation in the session window; FilterMatrix and PFilterMatrix for the filters in the bundle window; and CptMatrix, PCptMatrix, DptMatrix, and PDptMatrix for the controlpoints and datapoints in the view window.

3.7 Controlpoint and Datapoint Classes

The Pt class is an abstract class that contains the basic definition information underlying controlpoints and datapoints. This class also contains searching functions that can locate Pt objects in collections.

The Cpt and Dpt classes are abstract classes derived from Pt that contain additional data and representation functions for controlpoints and datapoints, respectively.

The PCpt and PDpt classes are derived from the Cpt class and fully specialize for process controlpoints and datapoints, respectively. These classes contain functions to create text representations for the user interface. They also include functions that cause interactions with the System server for the purposes of acquiring datapoints values and imposing Controlpoint effects on the system.

3.8 Window Classes

The Window class is an abstract class that provides fundamental support for creating, using, and destroying windows via the user server 11. A Window contains a collection of widget proxies (representing user interface elements). A Window also contains functions that set up handlers for incoming user server 11 messages, track the current window being used, and support basic window operations that create, reveal, hide, iconify, deiconify, retitle, and destroy windows.

The SWindow, BWindow, VWindow, and DWindow classes are abstract class derived from the Window class to support session, bundle, view, and display windows without respect to any domain. These classes initialize all widget proxies when a window is created, provide callback support for specific widgets, and intercept certain actions of the window manager such as those that would attempt to close windows without the notifying the client.

3.9 User Interface Classes

The UIWidget class is an abstract class that contains the data common to all classes supporting widget proxies. The UIWidget class maintains basic state information and has functions that formulate and send client messages to the user server 11.

The UIButton, UILabel, and UIToggle classes are derived from the UIWidget class. Instances of these classes are proxies for buttons, labels, and toggle buttons in the user interface. A UIButton or UILabel manage the text strings associated with buttons and labels. A UIToggle manages the binary state of a toggle button.

The UIMatrix class is also derived from the UIWidget class. A UIMatrix maintains a rich set of data that correspond to the current condition of a matrix in the user interface, such as the number of columns and rows, the text of row/column labels, widths, max lengths, alignments of labels, and current cell contents. A UIMatrix has functions that can change contents of cells, insert columns and rows, initiate editing of cell contents, and change the width of columns.

4. User-Level Function

Figure 2:
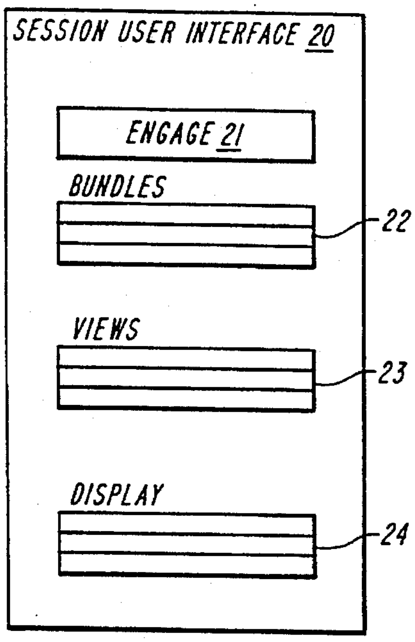
FIG. 2 depicts a user interface for Sessions in a preferred system debugger of FIG. 1.

Referring to FIG. 2, user server utilizes a session user interface (SUI) module 20 to accept user directives regarding the operation of the debugger 10 and specification of bundles 22, views 23, and displays 24. More particularly, the SUI 20 allows the user to organize and control activity for the Session as a whole, including creation and management of bundles, views, and displays, each of which have names specified by the user.

The SUI 20 provides an Engage command functionality 21 that responds to user directives to controls the debugger's connection to the system. This gives the user control over the debugger 10, e.g., if it is has an adverse affect on system performance. Preferably, however, even if the Engage command is deactivated, the debugger 10 will detect whether any subjects enter a state that requires attention by the debugger 10. The SUI also permits the user to save, restore and edit the definitions of bundles and views, allowing them to be reused and modified at a later time.

Figure 3:
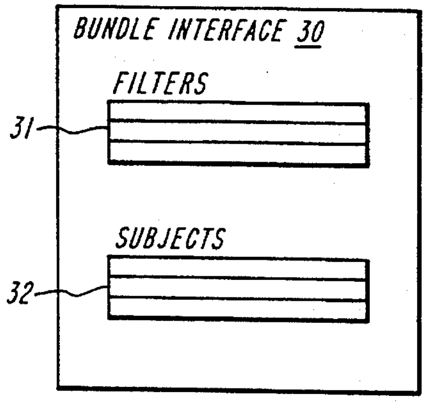
FIG. 3 depicts a user interface for Bundles in a preferred system debugger of FIG. 1.

Referring to FIG. 3, the user interface preferably provides a bundle user interface (BUI) 30 to accept user directives specifying a list of filters 31 and a list of subjects 32 that meet the filters' criteria. The user can simultaneously define any number of bundles. The BUI 30 allows the user to plan a bundle, i.e., to create and define filters that result in a collection of subjects (e.g., processes. IPCs) of interest. Filters cause subjects to be included or excluded from the subjects list based on whether each subject has attributes that match the attributes specified in the filter. Examples of attributes used in filters for processes are (1) the identity of the processors that it is running on (i.e., its topoligical location), (2) its image name (i.e., its functional unit name), and (3) its process identification number (PID) (i.e., its functional unit identification).

The subjects list 32 is updated in real-time to reflect current system conditions. It can be permanently associated with the bundle per user command. If the associated subjects are changed, this change to the bundle is propagated to displays per user command.

Figure 4:
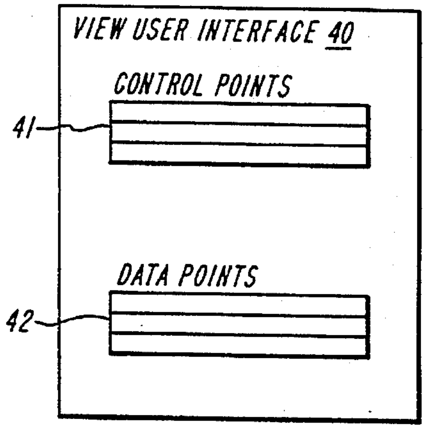
FIG. 4 depicts a user interface for Views in a preferred system debugger of FIG. 1.

Referring to FIG. 4, the user interface preferably provides a view user interface (VUI) 40 to accept user directives specifying lists of controlpoints 41 and datapoints 42. The VUI 40 allows the user to plan a view, i.e., to create and define controlpoints and datapoints separately from any bundle. If the definitions are changed, this change to the view is propagated to displays per user command. The user can simultaneously define any number of views.

Each Controlpoint is defined in terms of condition, scope, and effect. The debugger 10 processes the Controlpoint each time the specified condition occurs for any subject in every display that uses the Controlpoint, at which time the debugger 10 imposes the effect on the subjects that are included in the specified scope. The current operating status of each subject in a display is presented in the Controlpoint subdisplay 54.

The four possible values to scope for a Controlpoint are defined as follows: a scope of subject refers to only the subject that has encountered the controlpoint's condition; a scope of display refers to all subjects that appear in the display that includes the subject that has encountered the controlpoint's condition; a scope of processor refers to all subjects, regardless of their membership in any bundle, that are executing on a given processor; a scope of system refers to all subjects in the system, regardless of their membership in any bundle.

The three possible values of effect for a Controlpoint are defined as follows: an effect of suspend causes subjects to temporarily cease operating; an effect of debug causes subjects to be handed over to subject-specific low-level debugging tools; an effect of resume causes the subject to resume operation.

Each Datapoint is defined in terms of location, type, and count. The location defines the first data element of interest within a subject; the type defines the length and format of each element; the count defines the number of elements of interest. The debugger 10 processes the Datapoint periodically using a time interval specified by the user. Each time a Datapoint is processed, the debugger 10 retrieves the corresponding data in each subject in every Display that uses the Datapoint. If the Datapoint is not applicable to a given subject, that subject is bypassed. The data retrieved is presented in the Datapoint subdisplay 52 in each display user interface 50 that is currently active.

Figure 5:
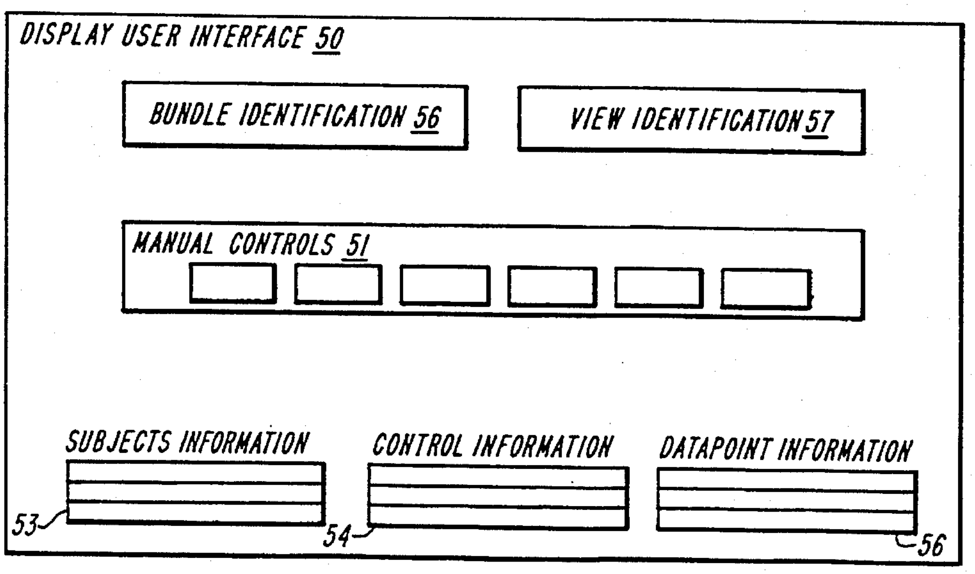
FIG. 5 depicts a user interface for Displays in a preferred system debugger of FIG. 1.

Referring to FIG. 5, the user interface preferably include a display user interface module (DUD 50 that accepts user directives specifying manual controls 51 and three subdisplays 52 that show current information about subjects 53, controlpoints 54, and datapoints 55. The bundle identification 56 indicates the name of the bundle that supplies the list of subjects for that appear in the three displays 52. The view identification 57 indicates the name of the view, if any, that supplies the controlpoints and/or datapoints for which subdisplays 54, 55 may appear. The manual controls 51 represent control actions that the user can apply to subjects that may be selected. The user can simultaneously define any number of displays.

A display is always associated with one bundle. The user can change this association at any time. A display can optionally be associated with a view, which also can be changed at any time per user command.

In view of the foregoing, those skilled in the art will appreciate that the debugger 5 permits access and modification of the datapoints independent of the operational state of the respective functional unit and, conversely, access and modification of the controlpoints independent of information accessed or affected by that functional unit. This provides considerable flexibility in controlling operation of the multiprocessor. For example, unlike conventional debuggers that typically permit the operator to modify datapoints only after operation has been suspended at a controlpoint (e.g., a "breakpoint"), an apparatus according to this aspect of the invention permits the operator to modify datapoints even if the multiprocessor is operating between controlpoints.

Summary

Described above are improved methods and apparatus for monitoring and controlling the operation of multiprocessor digital data processing systems. Those methods and apparatus meet the objects set forth above including, inter alia, providing an improved system for "debugging" the system-level operation of large computer configurations, and providing methods and apparatus for monitoring and controlling both system software, at the process level and in interprocess communication level, as well as system hardware, at the processing element level and the hardware interconnect level.

Those skilled in the art will appreciate that the embodiments described above are exemplary only, and that other apparatuses and methods—including modifications, additions and deletions—fall within the scope and spirit of the invention. Thus, for example, it will be appreciated that the techniques described above may be utilized on different computing systems and in connection with operating systems different than those described above. It will also be appreciated that differing data structures than those described in the detailed description may be used. And, by way of further example, that equivalent, but varied, procedures may be used to monitor and control software and hardware operation without changing the spirit of the invention.

In view of the foregoing, what we claim is:

1. In a multiprocessing digital data processor of the type having one or more functional units, each having at least one characteristic, each said functional unit being any of a processing element, an interconnect element, a process and an interprocess communication, wherein the characteristics of said functional units, together, comprise a first set of characteristics, the improvement for monitoring operation of said multiprocessing digital data processor, comprising A. view planning means responsive to operator input for generating a view signal specifying a second set of said characteristics to be monitored during operation of said multiprocessing digital data processor, said second set of characteristics including one or more characteristics in said first set of characteristics, B. bundle planning means responsive to operator input for generating a bundle signal specifying one or more of said functional units to be monitored during operation of said multiprocessing digital data processor, C. runtime means, coupled to said functional units during operation of said multiprocessing digital data processor, for monitoring at least said specified functional units to generate an output signal representative of values of said second set characteristics, D. said runtime means including i. supervisor means for performing said monitoring of said specified functional units and for selectively generating said output signal to be representative of values of said second set characteristics for selected Ones of said specified functional units.

ii. user interface means, coupled to said Supervisor means, for responding to said output signal to generate a display of said second set characteristics for selected ones of said specified functional units, iii. said supervisor means including delay means, responsive to delay in generation of said display by said user interface means, for decreasing an informational content of said output signal by at least one of a. transmitting, in said output signal, fewer values of said second set of characteristics than the number of such values obtained by monitoring said specified functional units, and b. monitoring fewer ones of said specified functional units and generating said output signal to be representative of those fewer values.

2. In a multiprocessing digital data processor according to claim 1, the further improvement wherein said characteristics of each said functional unit includes any of a datapoint and a controlpoint. said datapoint being an information accessed or affected by that functional unit, said controlpoint being an operational state of that functional unit, the further improvement wherein said view planning means A. means responsive to operator input for generating said view signal to specify, among said second set of said characteristics, any of a datapoint and a controlpoint of selected ones of said functional units, B. edit means responsive to operator input for any of accessing and altering at least selected ones of said datapoints and said controlpoints during operation of said digital data processor, and C. said edit means includes means for accessing and altering said selected datapoints independently of an operational state of the respective functional unit, and for accessing and altering said controlpoints independent of information accessed or affected by that functional unit.

3. In a multiprocessing digital data processor according to claim 1, the further improvement wherein said runtime means includes means for i. determining for each of said specified functional units, whether each characteristic in said second set that is a characteristic of that functional unit, ii. responding to determination that a characteristic in said second set is a characteristic of a respective functional unit for generating said output signal to include, for that functional unit, a subsignal representative of a value of that characteristic, iii. responding to determination that a characteristic in said second set is not a characteristic of a respective functional unit for generating said output signal to include, for that functional unit, a subsignal representative of the inapplicability of that characteristic.

4. In a multiprocessing digital data processor according to claim 1, the further improvement wherein said bundle planning means includes filter means for accepting operator input specifying, with respect to said one or more of said functional units to be monitored, any of (i) a functional unit identification, (ii) a functional unit name, and (iii) a topological location in said digital data processor.

5. A method for monitoring the operation of a multiprocessing digital data processor of the type having one or more functional units, each having at least one characteristic, each said functional unit being any of a processing element, an interconnect element, a process and an interprocess communication, wherein the characteristics of said functional units, together, comprise a first set of characteristics, said method comprising A. a view planning step for responding to operator input to generate a view signal specifying a second set of said characteristics to be monitored during operation of said nultiprocessing digital data processor, said second set of characteristics including one or more characteristics in said first set of characteristics, B. a bundle planning step for responding to operator input to generate a bundle signal specifying one or more of said functional units to be monitored during operation of said multiprocessing digital data processor, C. a runtime step for monitoring at least said specified functional units to generate an output signal representative of values of said second set characteristics, D. said runtime step including i. a supervisor step for performing said monitoring of said specified functional units and for selectively generating said output signal to be representative of values of said second set characteristics for selected ones of said specified functional units, ii. a user interface step for responding to said output signal to generate a display of said second set characteristics for selected ones of said specified functional units, iii. said supervisor step including a delay step, for responding to delay in generation of said display by said user interface means, and for decreasing an informational content of said output signal by at least one of a. transmitting, in said output signal, fewer values of said second set of characteristics than the number of such values obtained by monitoring said specified functional units, and b. monitoring fewer ones of said specified functional units and generating said output signal to be representative of those fewer values.

6. A method according to claim 5, wherein said characteristics of each said functional unit includes any of a datapoint and a controlpoint, said datapoint being an information accessed or affected by that functional unit, said controlpoint being an operational state of that functional unit, wherein said view planning step includes A. a step for responding to operator input to generate said view signal to specify, among said second set of said characteristics, any of a datapoint and a controlpoint of selected ones of said functional units, B. an edit step for responding to operator input for any of accessing and altering at least selected ones of said datapoints and said controlpoints during operation of said digital data processor, and C. said edit step includes a step for accessing and altering said selected datapoints independently of an operational state of the respective functional unit, and for accessing and altering said controlpoints independent of information accessed or affected by that functional unit.

7. A method according to claim 5, wherein said runtime step includes the steps of i. determining, for each of said specified functional units, whether each characteristic in said second set that is a characteristic of that functional unit, ii. responding to determination that a characteristic in said second set is a characteristic of respective functional unit for generating said output signal to include, for that functional unit, a subsignal .representative of a value of that characteristic.

iii. responding to determination that a characteristic in said second set is not a characteristic of a respective functional unit for generating said output signal to include, for that functional unit, a subsignal representative of the inapplicability of that characteristic.

8. A method according to claim 5 wherein said bundle planning step includes a filter step for accepting operator input specifying, with respect to said one or more of said functional units to be monitored, any of (i) a functional unit identification. (ii) a functional unit name, and (iii) a topological location in said digital data processor.

* * * * *

UNITED STATES PATENT AND TRADEMARK OFFICE
CERTIFICATE OF CORRECTION

PATENT NO. : 5,602,729
DATED : February 11, 1997
INVENTOR(S) : Michael Krueger and Paul P. Pennell It is certified that error appears in the above-identified patent and that said Letters Patent is hereby corrected as shown below:

Column 19, line 34: please delete "Ones"; and insert therefor -- ones --.

Column 19, line 35: please delete "Supervisor"; and insert therefor -- supervisor --.

Column 19, line 54: please delete "controlpoint."; and insert therefor -- controlpoint,--.

Column 20, line 39: please delete "nultiprocessing"; and insert therefor -- multiprocessing --.

Column 22, line 7: please delete "of respective"; and insert therefor -- of a respective --.

Column 22, line 9: please delete ".repre-"; and insert therefor -- repre- --.

Column 22, line 10: please delete "characteristic."; and insert therefor -- characteristic,--.

Signed and Sealed this

Thirteenth Day of October 1998

Attest:

BRUCE LEHMAN

*Attesting Officer* *Commissioner of Patents and Trademarks*